US010780738B2

(12) United States Patent
Bowden, Sr.

(10) Patent No.: US 10,780,738 B2
(45) Date of Patent: Sep. 22, 2020

(54) LUG WRENCH WITH SECURE CLAMPING MECHANISM

(71) Applicant: Frederick L. Bowden, Sr., Radnor, PA (US)

(72) Inventor: Frederick L. Bowden, Sr., Radnor, PA (US)

( * ) Notice: Subject to any disclaimer, the term of this patent is extended or adjusted under 35 U.S.C. 154(b) by 218 days.

(21) Appl. No.: 15/947,999

(22) Filed: Apr. 9, 2018

(65) Prior Publication Data

US 2019/0308449 A1 Oct. 10, 2019

(51) Int. Cl.
*B60B 29/00* (2006.01)
*B25G 1/04* (2006.01)
*B25G 1/00* (2006.01)
*B25B 13/44* (2006.01)

(52) U.S. Cl.
CPC ............ *B60B 29/003* (2013.01); *B25B 13/44* (2013.01); *B25G 1/005* (2013.01); *B25G 1/043* (2013.01)

(58) Field of Classification Search
CPC ....... B60B 29/003; B25B 13/44; B25G 1/005; B25G 1/043
USPC ...................... 81/177.2, 124.2, 113
See application file for complete search history.

(56) References Cited

U.S. PATENT DOCUMENTS

| 803,692 | A | * | 11/1905 | Hill | B25B 13/44 81/113 |
| 2,497,214 | A | * | 2/1950 | Dreyer | B25B 23/103 81/53.2 |
| 2,701,489 | A | * | 2/1955 | Osborn | B25B 23/103 81/53.2 |
| 3,735,650 | A | * | 5/1973 | Weng, Jr. | B25B 27/18 81/53.2 |
| 6,199,456 | B1 | * | 3/2001 | Hlady | B25G 1/005 81/125.1 |
| 6,604,441 | B2 | * | 8/2003 | Lin | B25B 13/06 81/177.2 |
| 6,945,145 | B1 | * | 9/2005 | Kesinger | B23B 31/207 279/42 |

* cited by examiner

*Primary Examiner* — Hadi Shakeri
(74) *Attorney, Agent, or Firm* — Meunier Carlin & Curfman LLC

(57) ABSTRACT

A lug wrench apparatus comprising a collet-type assembly whereby the socket clamps to the lug nut in a manner similar to the way a collet clamps a router bit. The clamping mechanism can be provided either by a screw-compression, or an eccentric cam compression. Arbitrarily large amounts of torque can be applied by means of an extension which fits over the arm of a wrench that is clamped to the shaft of the collet.

5 Claims, 10 Drawing Sheets

LUG WRENCH WITH SECURE CLAMPING MECHANISM

TECHNICAL FIELD OF THE DISCLOSURE

The present disclosure relates to the general art of tools, and to the particular field of tools used in conjunction with vehicle tires.

BACKGROUND OF THE DISCLOSURE

This disclosure provides a means of removing tightened lug nuts from automobile or truck wheels. Today, most lug nuts are tightened at the factory or at motor vehicle repair facilities with high torque pneumatic impact drivers or similar devices. Installers use high torque loads to ensure that lug nuts will not come loose during vehicle operation, possibly resulting in loss of a wheel with catastrophic consequences. Although most vehicles come equipped with a lug wrench of the proper size for the lugs, these wrenches do not fit tightly over the lugs and are typically less than 18" in length to permit them to fit in the vehicle's trunk. The combination of a loose-fitting wrench and an inadequate lever arm can make it difficult if not impossible for a person of ordinary strength to remove a lug nut that was tightened with a powered wrench or driver. This in turn prevents them from being able to change their own tire if they experience a flat on the road. Experience has shown that even the wrenches carried on auto club service trucks and similar vehicles may not be adequate in all cases to change a flat tire.

Also, the geometry of the lug wrench, with some offset distance between the plane of rotation of the face of the lug nut, and the plane of rotation in which the lug wrench arm is rotated, can induce a torque component that is orthogonal to the plane of rotation of the socket and the lug nut. This orthogonal torque component can cause the socket to disengage from the lug if the user is applying a large amount of force to the lug wrench, and the user can lose balance and fall.

The subject matter of the present disclosure provides both (a) a means of applying large amounts of torque to the lug, to remove or tighten it, and (b) a means of securely and tightly attaching the wrench to the lug, thereby reducing the risk that the wrench will disengage from the lug nut.

BRIEF SUMMARY OF THE DISCLOSURE

The subject matter of the present disclosure comprises (1) a compressible hexagonal socket with a hexagonal drive shaft, (2) a compression sleeve, (3) a compression mechanism, (4) a wrench, which may include a ratchet mechanism, and (5) an extension handle.

To operate the wrench, the user slides the assembled compressible socket and compression sleeve onto a lug nut, and then places the working end of the wrench over the hexagonal drive shaft of the socket. The user then slides or screws the compression thrust washer over the drive shaft of the socket, and applies compression by either tightening the washer using its internal threads, or compressing it with an eccentric cam lever, to cause the compression sleeve to slide forward over the compression socket, thereby exerting very powerful clamping force on the lug nut. The compression mechanism may be a threaded thrust washer which engages threads on the drive shaft, thereby compressing transmitting force through the face of the wrench onto the compression sleeve, or it may be a lever with an eccentric cam that applies force to an unthreaded thrust washer, which in turn transmits the compression force through the wrench face and into the compression sleeve. In either case, the socket becomes firmly clamped to the facets of the lug, thereby greatly reducing the possibility that the socket will slide off the lug when torque is applied.

DETAILED DESCRIPTION

Figure 1:
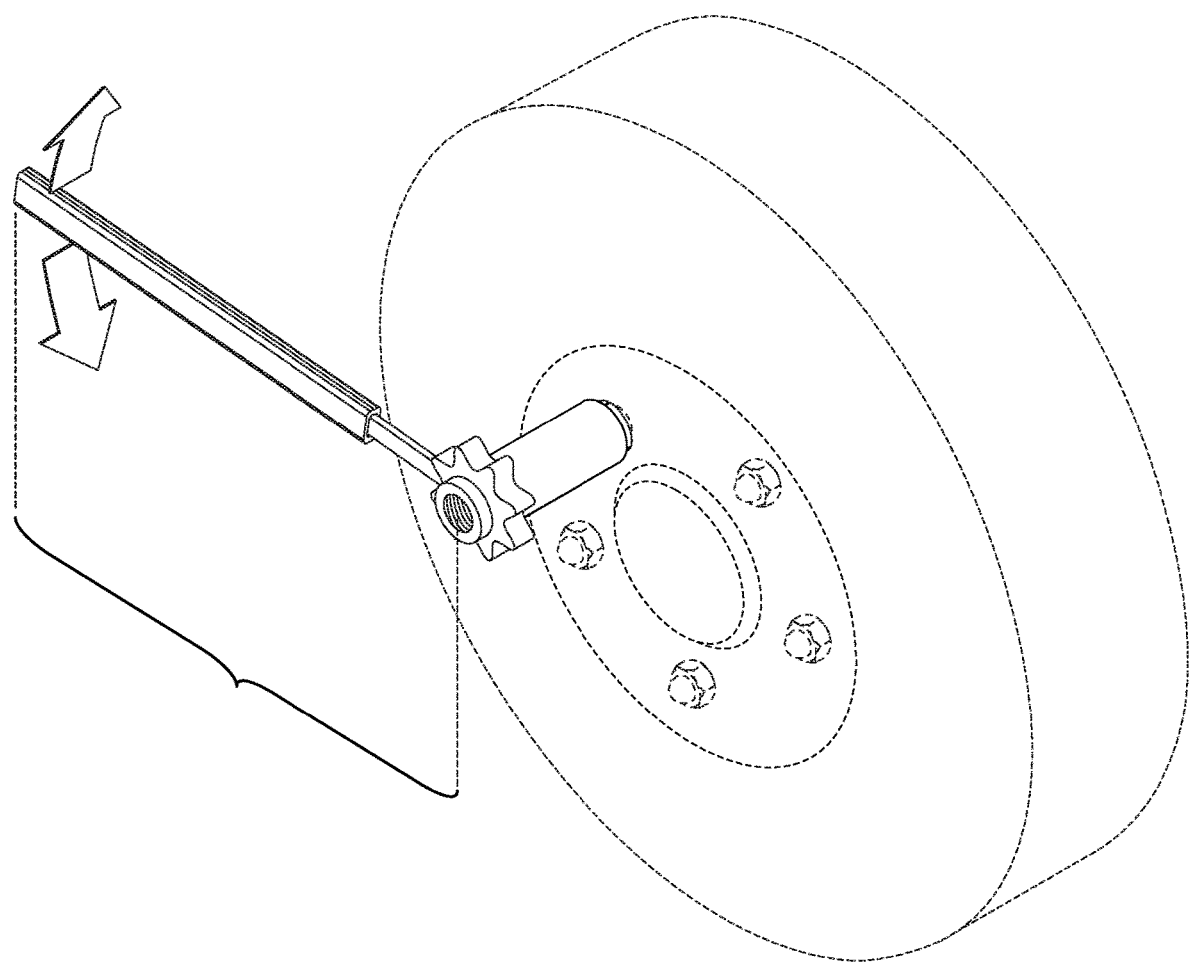
FIG. 1. illustrates the apparatus of the present disclosure affixed to a lug nut on a notional vehicle wheel.
Figure 2:
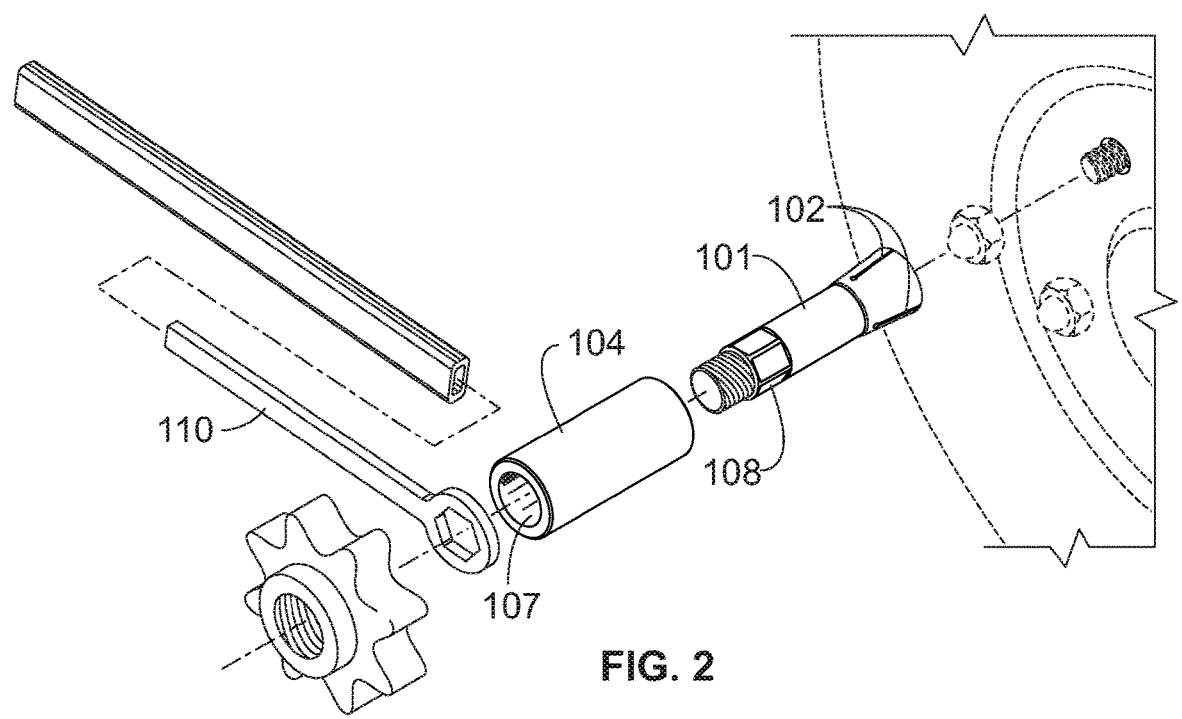
FIG. 2. Exploded view of FIG. 1.
Figure 3:
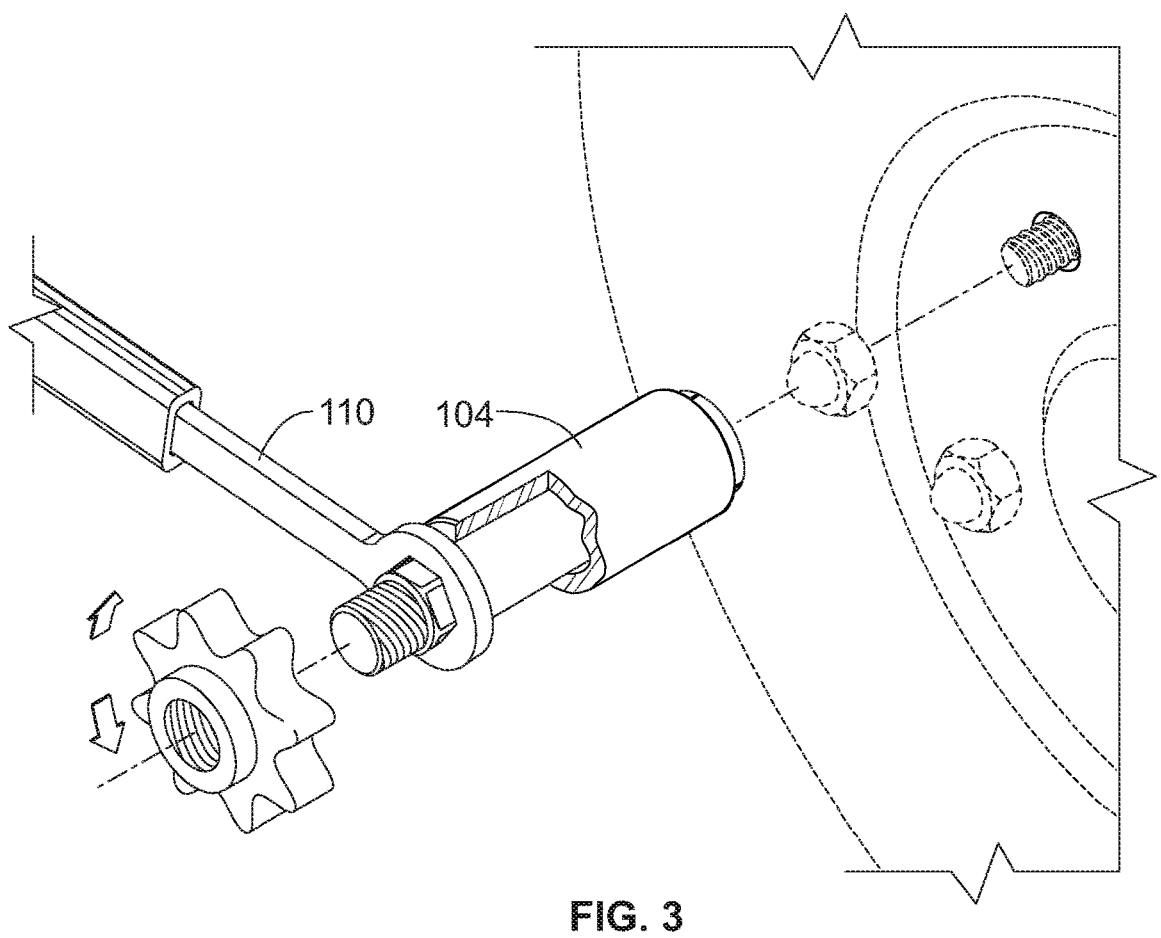
FIG. 3. Partially exploded and cutaway view of entire apparatus showing threaded thrust washer means of compression of sleeve and socket.
Figure 4:
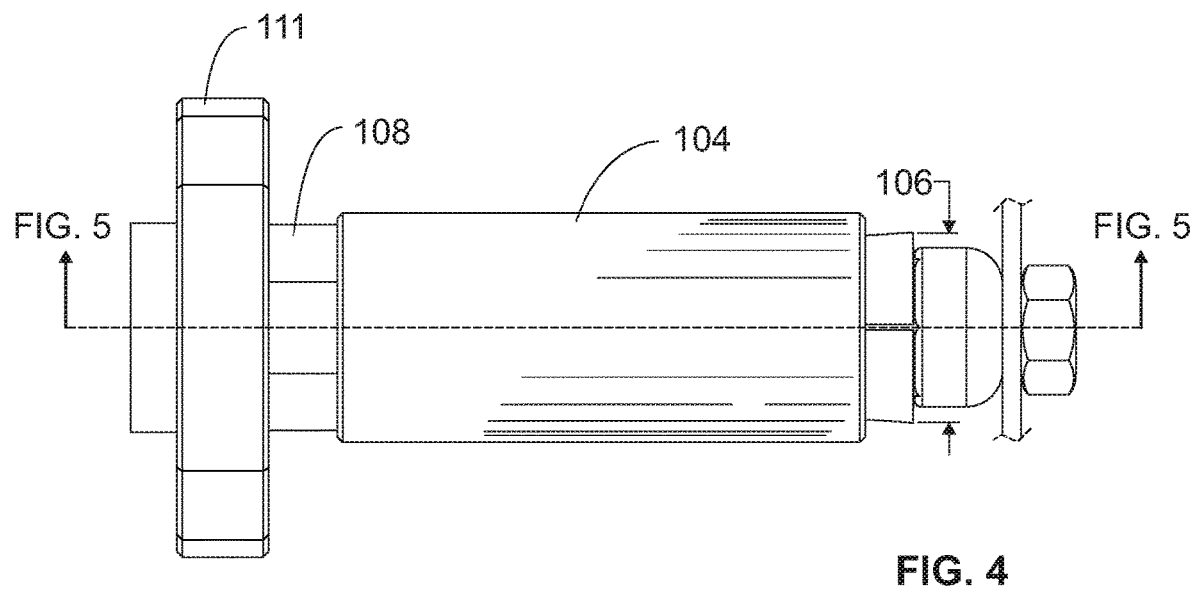
FIG. 4. Side view of assembled socket, compression sleeve and threaded thrust washer in un-compressed position.
Figure 5:
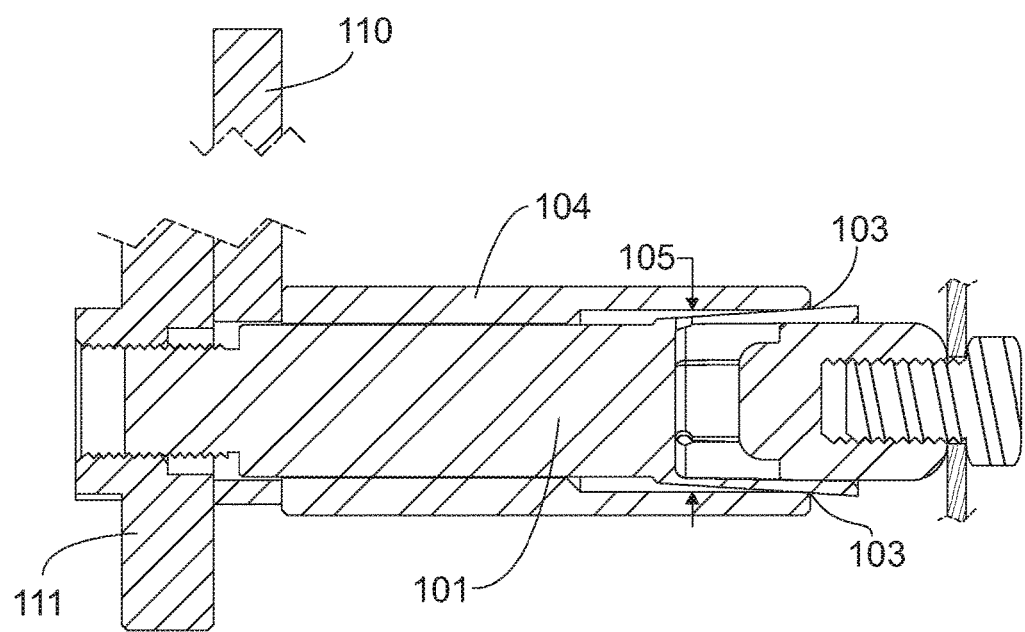
FIG. 5. Cross sectional side view of assembled socket, compression sleeve and threaded thrust washer attached to lug nut in un-compressed position.
Figure 6:
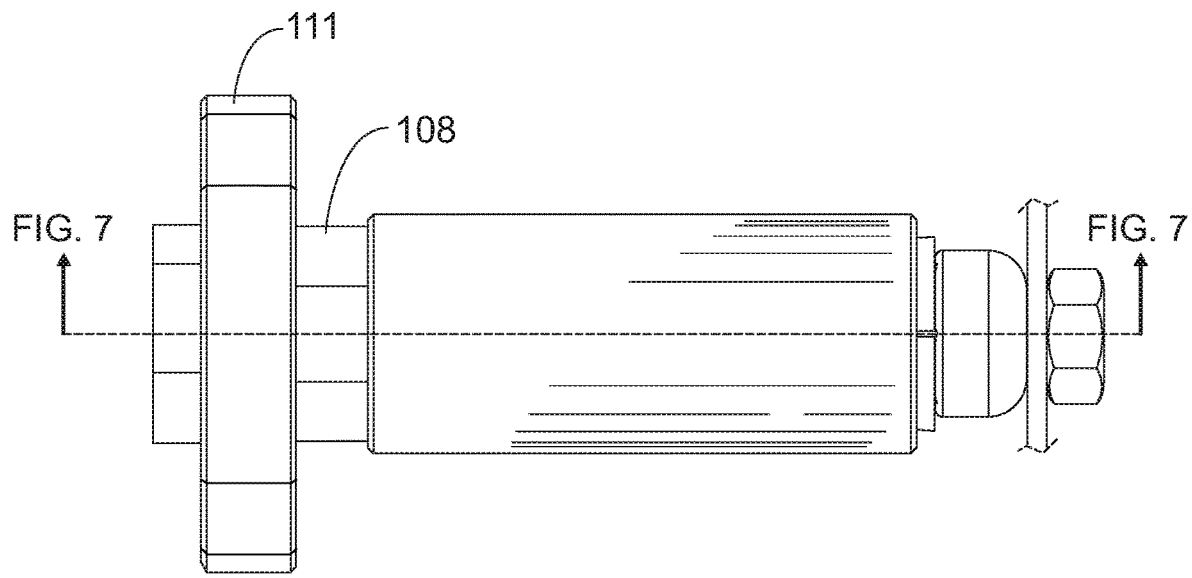
FIG. 6. Side view of assembled socket, compression sleeve and threaded thrust washer in compressed position.
Figure 7:
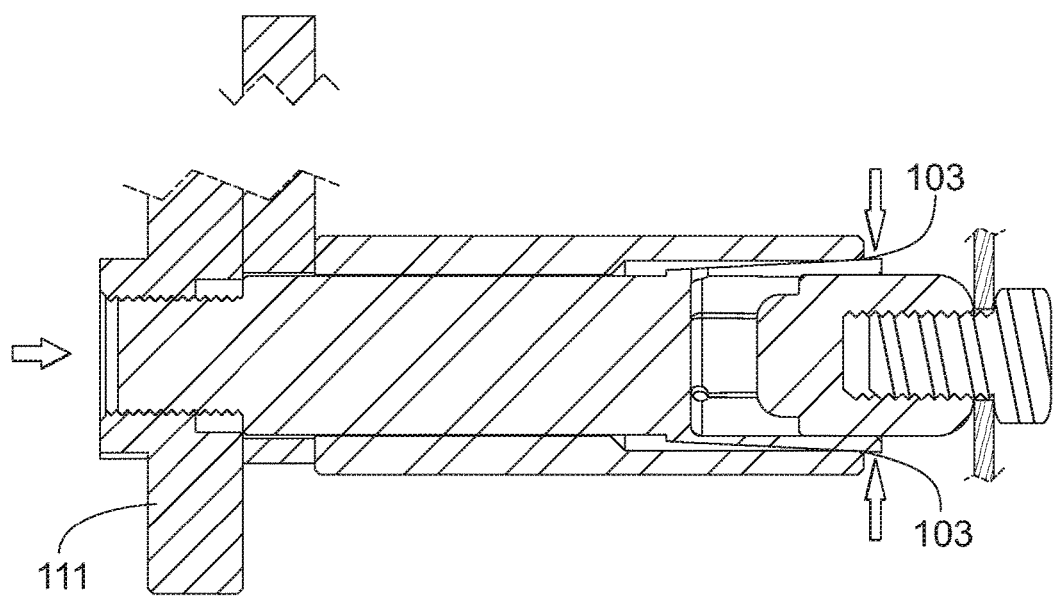
FIG. 7. Cross sectional side view of assembled socket, compression sleeve and threaded thrust washer attached to lug nut in compressed position.
Figure 8:
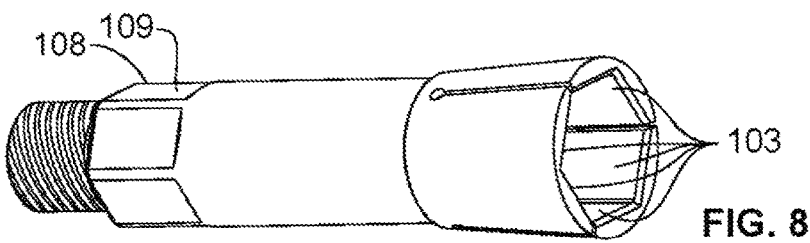
FIG. 8. Perspective view of compression socket with threaded drive shaft (rotated).
Figure 9:
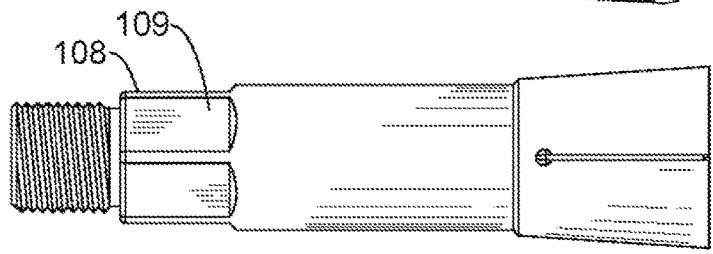
FIG. 9. Side view of compression socket with threaded drive shaft.
Figure 11:
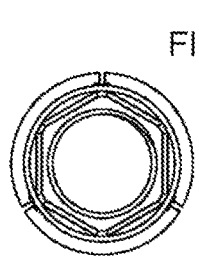
FIG. 11. Drive end view of compression socket.
Figure 10:
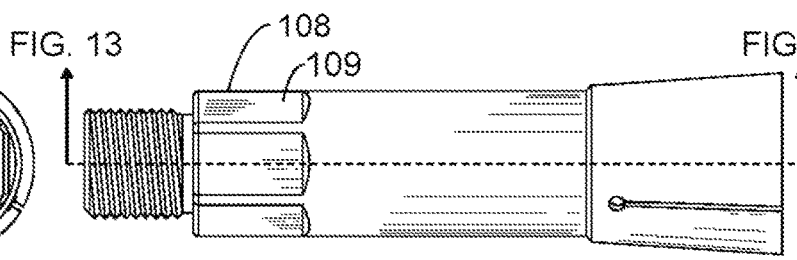
FIG. 10. Side view of compression socket with threaded drive shaft.
Figure 12:
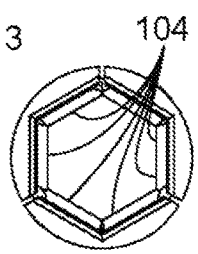
FIG. 12. Socket end view of compression socket.
Figure 13:
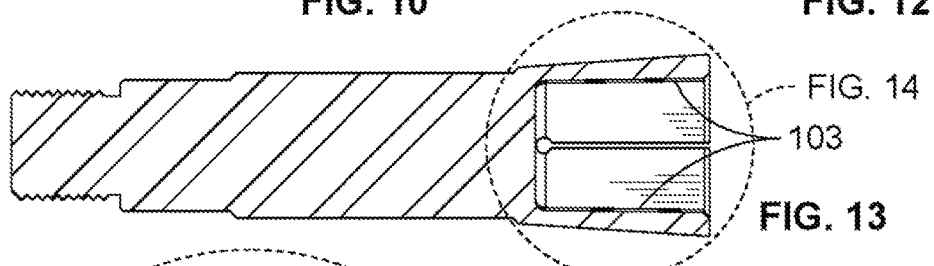
FIG. 13. Side view of compression socket with internal detail.
Figure 14:
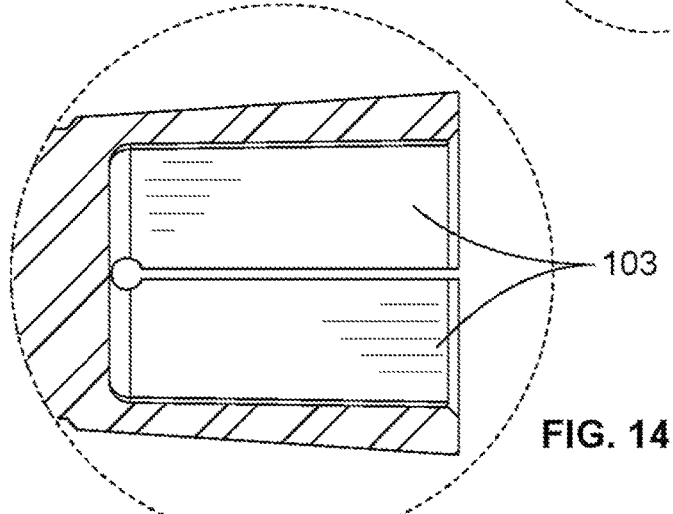
FIG. 14. Enlarged side view of compression socket with internal detail.
Figure 15:
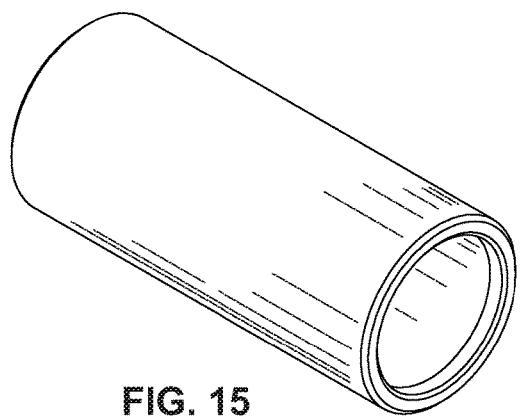
FIG. 15. Perspective view of compression sleeve—socket compression end.
Figure 16:
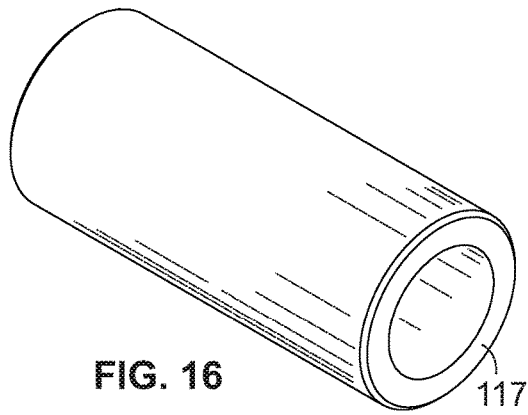
FIG. 16. Perspective view of compression sleeve—drive shaft end.
Figure 18:
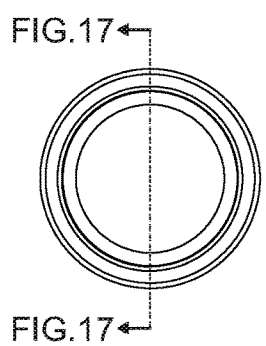
FIG. 18. End view of compression sleeve—socket compression end.
Figure 17:
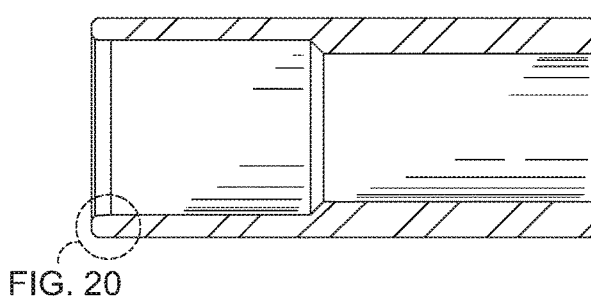
FIG. 17. Cross section view of compression sleeve.
Figure 19:
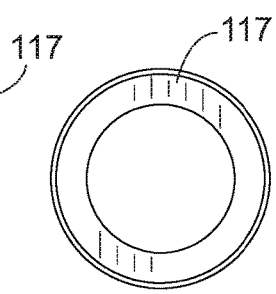
FIG. 19. End view of compression sleeve—drive shaft end
Figure 20:
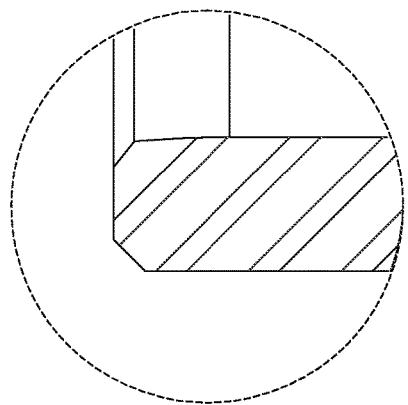
FIG. 20. Expanded detail of cross section side view of lip of compression sleeve.
Figure 21:
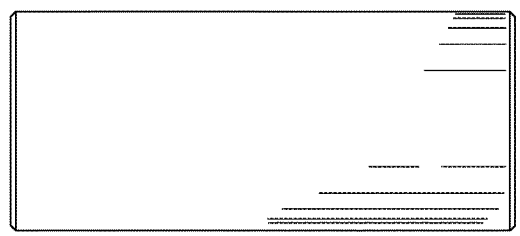
FIG. 21. External side view of compression sleeve
Figure 22:
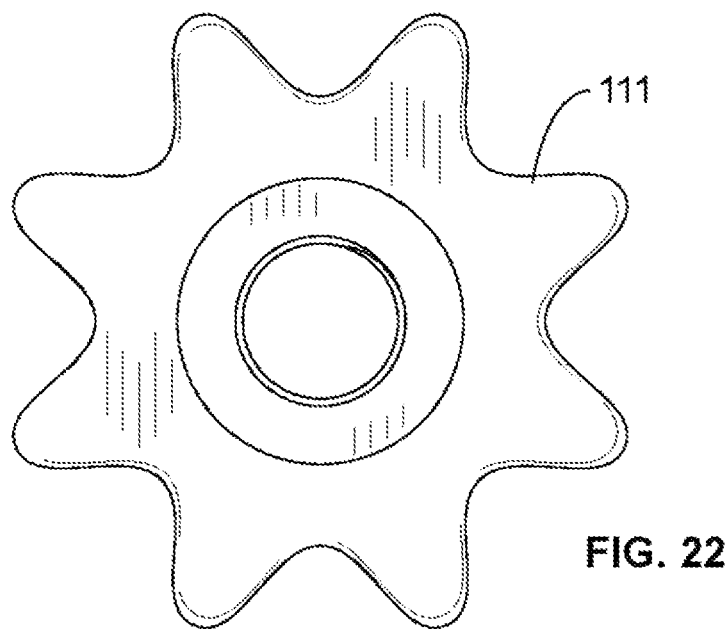
FIG. 22. End view of threaded thrust washer showing hex facets.
Figure 23:
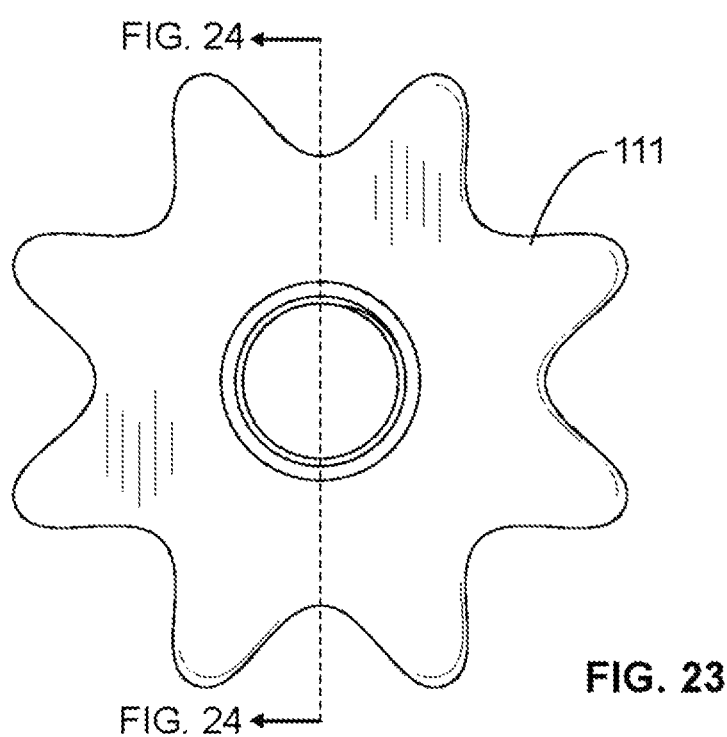
FIG. 23. End view of threaded thrust washer showing face that contacts compression sleeve.
Figure 24:
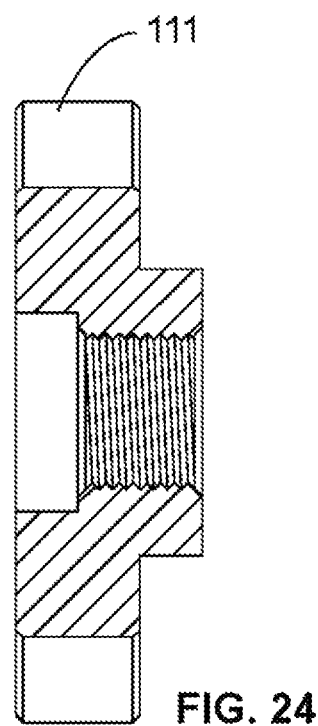
FIG. 24. Cross section side view of threaded thrust washer.
Figure 25:
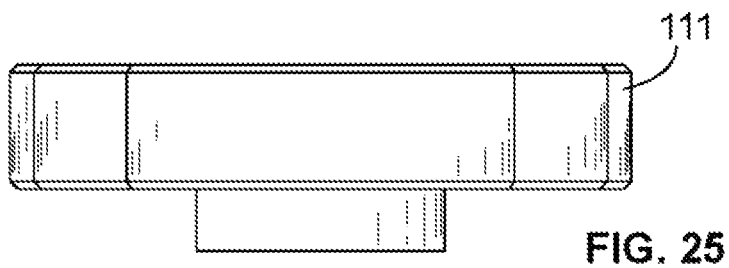
FIG. 25. Side view of threaded thrust washer showing knurled surface for secure grip.
Figure 26:
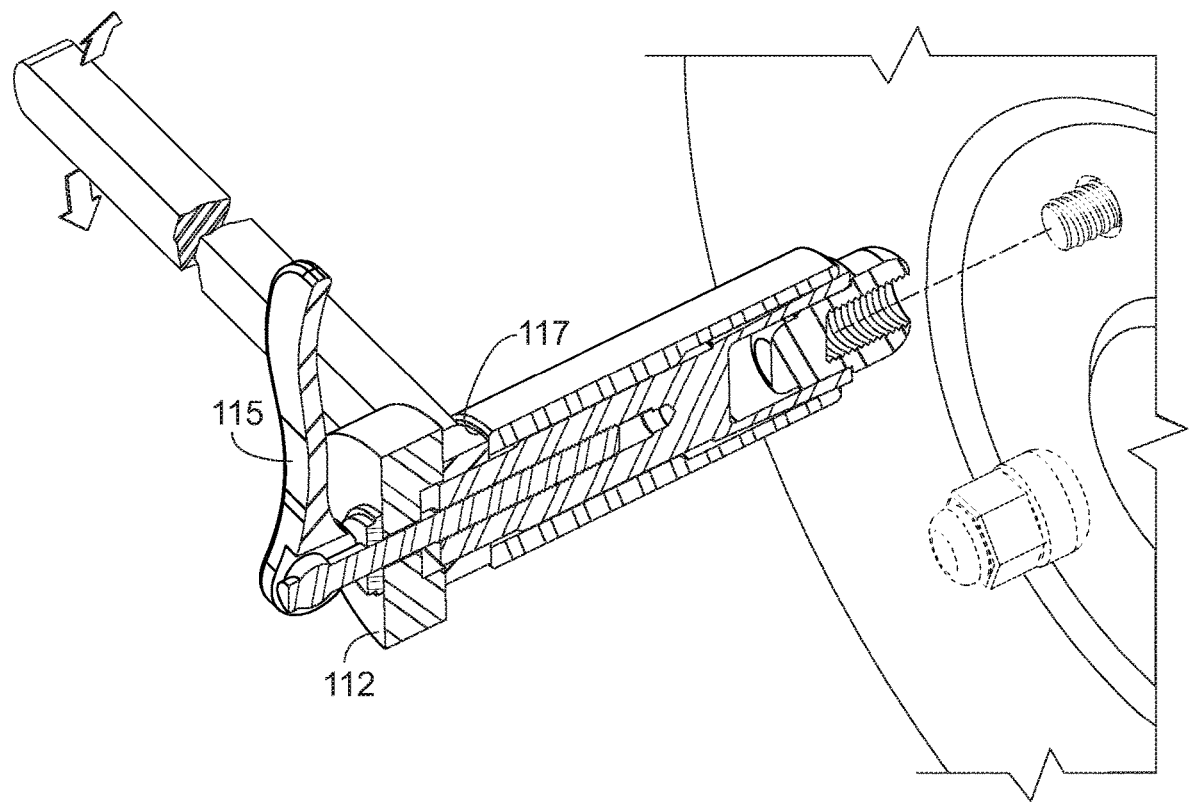
FIG. 26. Cross section perspective view of assembled apparatus with cam and lever compression means uncompressed.
Figure 27:
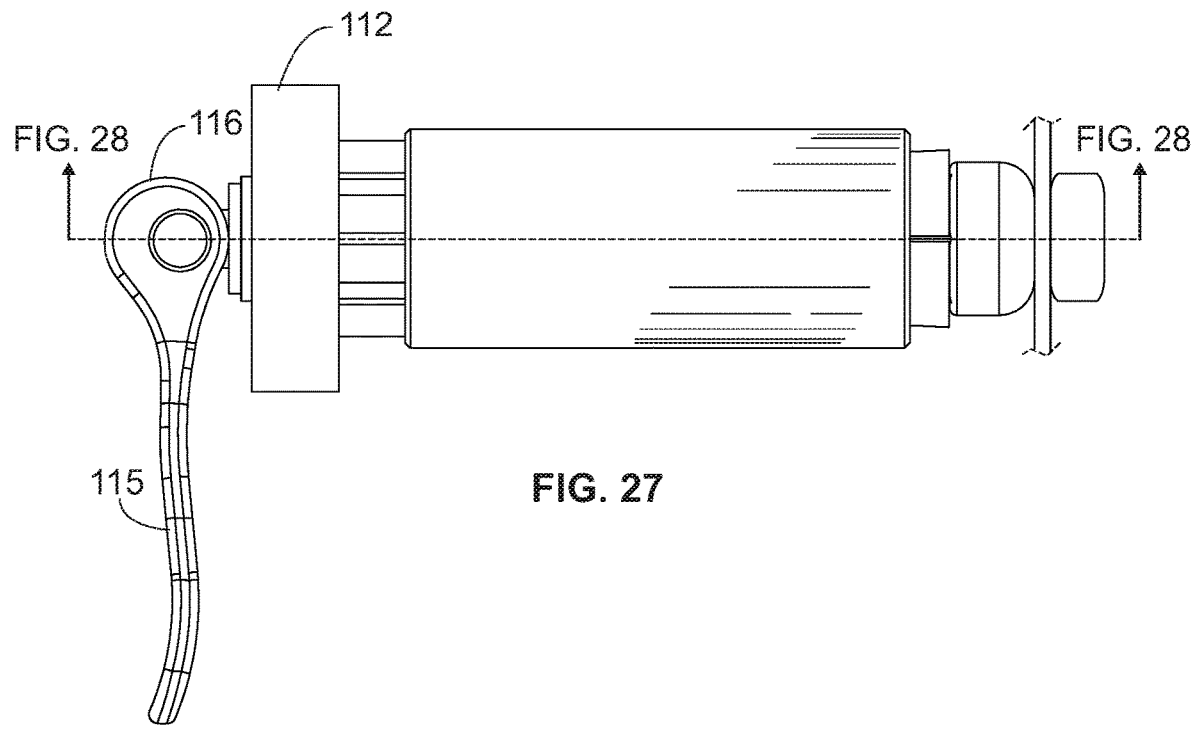
FIG. 27. Side view of assembled apparatus with cam and lever compression means uncompressed.
Figure 28:
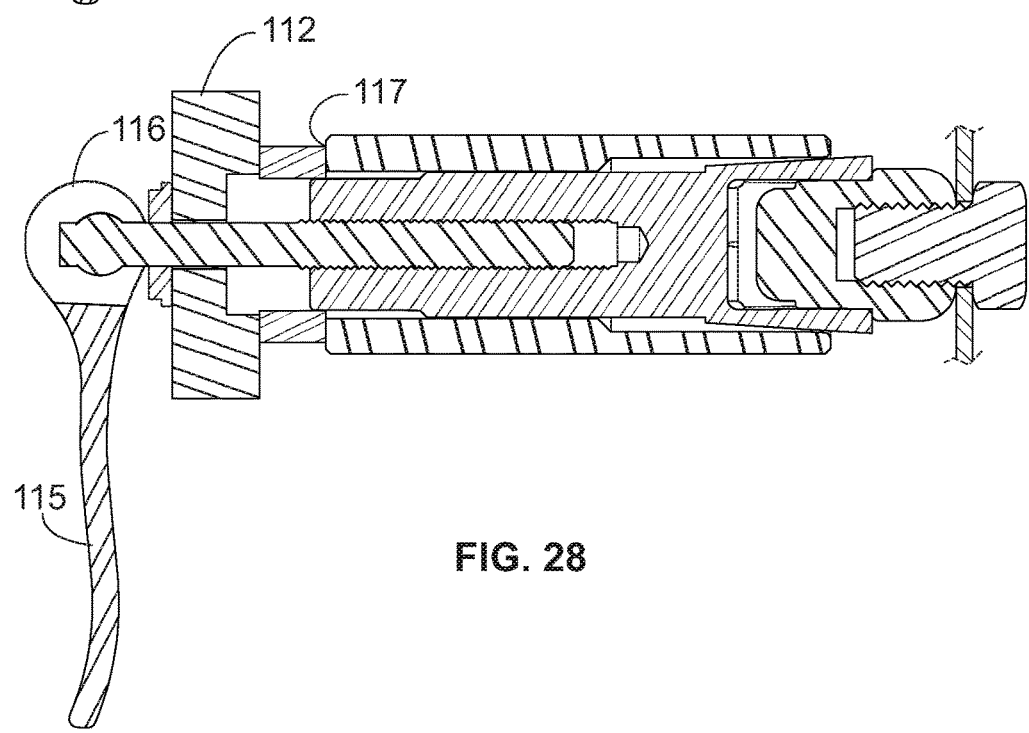
FIG. 28. Cross Section side view of assembled apparatus with cam and lever compression means uncompressed.
Figure 29:
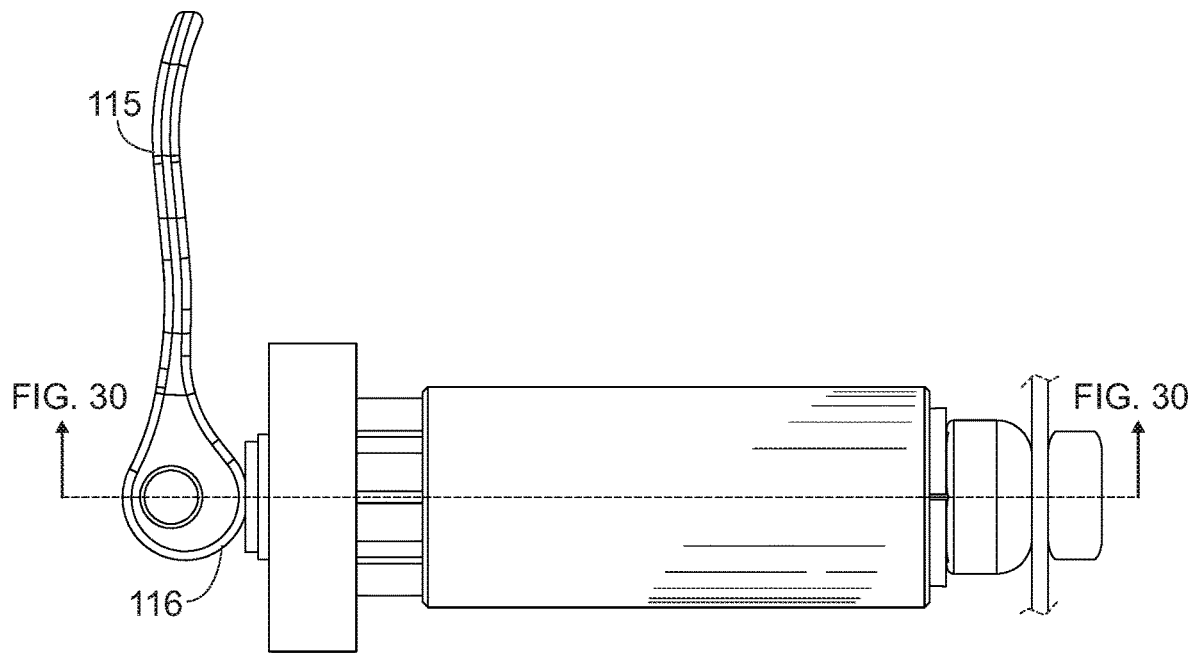
FIG. 29. Side view of assembled apparatus with cam and lever compression means compressed.
Figure 30:
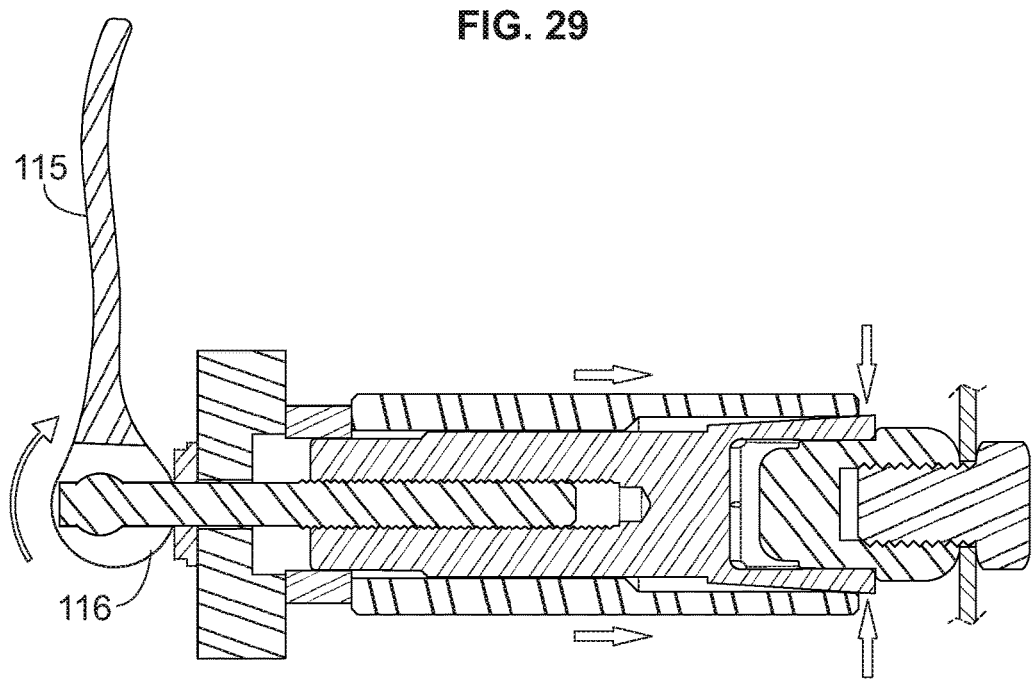
FIG. 30. Cross Section side view of assembled apparatus with cam and lever compression means compressed.

The problem of manually removing lug nuts from vehicle wheels has increased as service stations, tire shops, and manufacturers have increased the amount of torque applied to lug nuts when assembling and repairing vehicles. The subject matter of the present disclosure provides a manually operated apparatus that permits an individual to safely and easily remove even extremely tight lug nuts, regardless of their physical strength.

With reference to the various FIGS, the elements of the apparatus are (1) a hexagonal socket [101] sized to slide easily over the lug nut of a subject vehicle, with slits [102] at 3 or more vertices between the internal socket faces [103] to permit limited flexion, (2) a compression sleeve [104] that fits over the socket with internal diameter [105] slightly smaller than the external diameter [106] of the uncompressed socket, and with an opening [107] at the opposite end that permits the driving portion [108] of the socket to extend beyond the sleeve exposing hexagonal faces [109] over which (3) a wrench [110], which may be open ended or closed end, and which may be fixed or ratcheting in operation, is slid, (4) a compression thrust washer [111], [112] which may have a hexagonal central hole [113] or a circular threaded hole [114], and (5) optionally, if the compression thrust washer has a hexagonal hole, a compression lever [115] with an eccentric cam face [116] such that rotating the lever induces compression of the compression thrust washer against the outer face of the wrench [110], which in turn transmits the said compression force against the posterior face of the compression sleeve [117]. The compression sleeve, in turn, slides toward the anterior end of the socket [101], thereby compressing the internal faces of the socket [103] against the faces of the subject lug nut. An extension lever [118] is affixed to the wrench handle, either by sliding the lever over the wrench handle, or by means of interlocking pins and slots.

The operator then applies force to the extension lever at whatever distance from the central axis of the socket that produces sufficient torque to remove the nut given the operator's personal strength.

I claim:

1. An apparatus for removing and tightening nuts, including lug nuts on vehicular wheels comprising:
   a hexagonal socket having a tapered internal diameter and having longitudinal slits that provide flexion of the faces of the socket;
   a compression sleeve having a portion with a larger tapered internal diameter that is adapted to receive the hexagonal socket;
   a wrench having a handle adapted to receive extensions, the wrench having an engagement end that drives the hexagonal socket;
   a compression thrust washer that locks the wrench, compression sleeve and hexagonal socket together;
   wherein the wrench is a closed end wrench and is captured between the compression sleeve and the compression thrust washer; and
   a lever having an eccentric cam that pivots on a transverse pin through the posterior end of a threaded rod which threadedly engages a threaded hole in the posterior end of the socket.

2. The Apparatus as recited in claim 1 wherein the compression thrust washer defines a central hole that slidably engages a smooth surface of the threaded rod.

3. The Apparatus as recited in claim 1 wherein an extension lever is removably attached to the wrench to apply torque to the apparatus.

4. The Apparatus as recited in claim 1 wherein the wrench is a closed end ratchet wrench.

5. The Apparatus as recited in claim 1 wherein the handle of the wrench is sized to accept a tubular extension handle with an inside diameter large enough to slide over the wrench handle in telescope fashion.

\* \* \* \* \*